United States Patent
Sreedharan

(10) Patent No.: US 8,560,788 B1
(45) Date of Patent: Oct. 15, 2013

(54) METHOD OF PERFORMING BACKUPS USING MULTIPLE STREAMS

(75) Inventor: Sachhin Aayellath Sreedharan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 862 days.

(21) Appl. No.: 12/748,492

(22) Filed: Mar. 29, 2010

(51) Int. Cl.
*G06F 12/00* (2006.01)
*G06F 13/00* (2006.01)
*G06F 13/28* (2006.01)

(52) U.S. Cl.
USPC .................. 711/162; 711/161; 707/640

(58) Field of Classification Search
None
See application file for complete search history.

(56) References Cited

U.S. PATENT DOCUMENTS

| | | | |
|---|---|---|---|
| 6,003,044 A * | 12/1999 | Pongracz et al. | 1/1 |
| 7,051,173 B2 * | 5/2006 | Tsuchiya et al. | 711/162 |
| 8,117,169 B2 * | 2/2012 | Derk et al. | 707/652 |
| 8,271,443 B1 * | 9/2012 | Swift et al. | 707/640 |
| 2004/0250162 A1 * | 12/2004 | Halley et al. | 714/13 |
| 2007/0220214 A1 * | 9/2007 | Sandrock-Grabsky | 711/153 |

* cited by examiner

*Primary Examiner* — Yaima Rigol
(74) *Attorney, Agent, or Firm* — Krishnendu Gupta; Robert Kevin Perkins; Joseph D'Angelo

(57) ABSTRACT

A method, system, and a computer program product for performing backups using multiple streams. An aspect of the present invention performs the backups based on the size of the data sets sought to be backed up. In particular, the backups of bigger data sets (in terms of size) are performed before the backups of smaller data sets. It is accordingly observed that the backup window is reduced (without increasing the number of streams).

10 Claims, 7 Drawing Sheets

METHOD OF PERFORMING BACKUPS USING MULTIPLE STREAMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to software systems, and more specifically to methods, systems, and a computer program product for performing backups using multiple streams.

BACKGROUND

In many environments, backups are performed using multiple streams. Each stream represents a physical/virtual connection between the source system (storing the data sets) and the target system (storing a copy of the data sets after the backup is completed). One reason for having multiple streams is to reduce the backup window (the duration taken to perform the backup of a sequence of data sets) by performing the backups of multiple data sets concurrently. Even in such environments, it may still be desirable to further reduce the backup window.

SUMMARY

An aspect of the present invention performs the backup of a second data set before the backup of a first data set, though the second data set follows the first data set according to the specific order received along with the collection of data sets including the first and second data sets.

BRIEF DESCRIPTION OF DRAWINGS

The above and further advantages of the present invention may be better under stood by referring to the following description taken into conjunction with the accompanying drawings in which.

DETAILED DESCRIPTION

Figure 1:
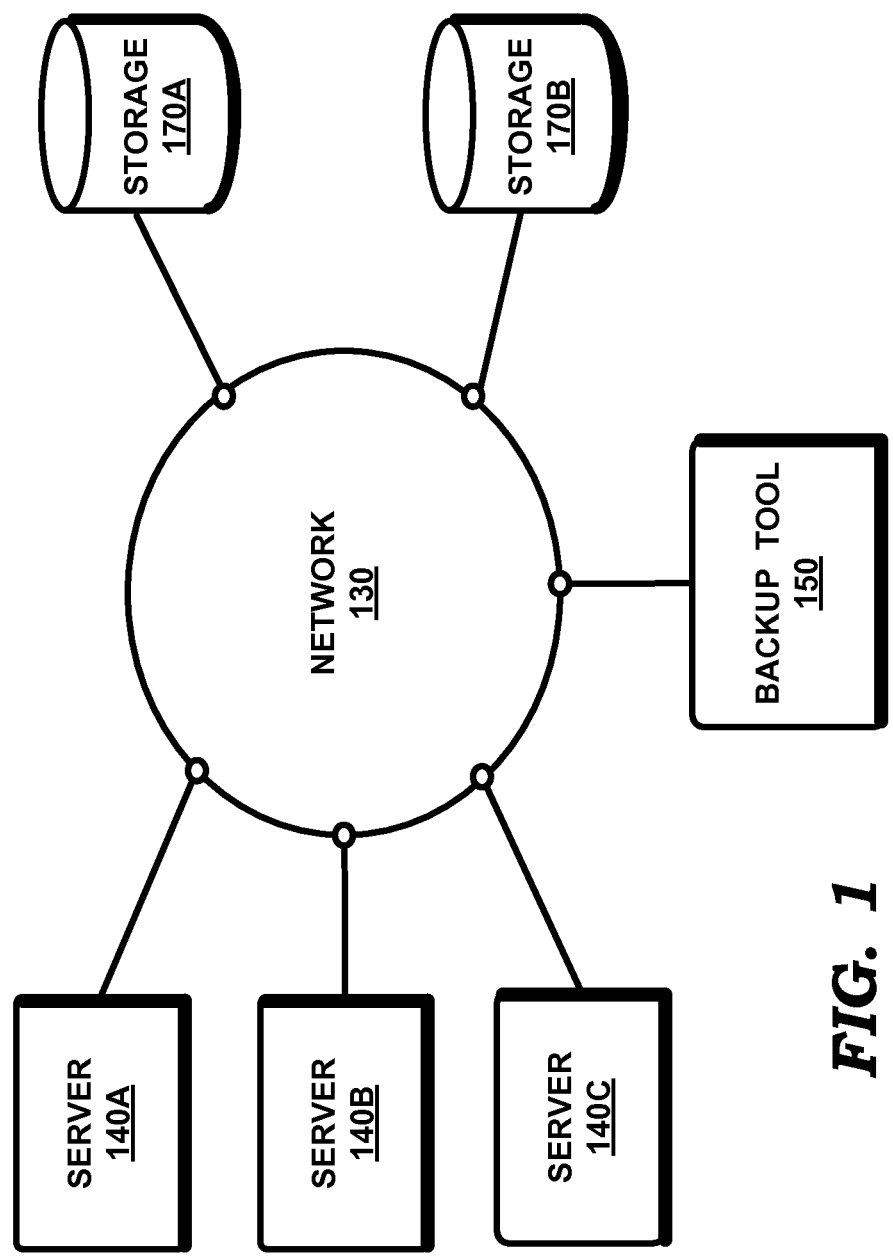
FIG. 1 shows an example environment in which several aspects of the present invention are implemented in one embodiment.

Current approaches to performing backups using multiple streams uses the specific order in which a collection of the data sets are indicated (by a user/administrator) to be backed up. For example, if a first data set is indicated to be followed by a second data set according to the specific order, the backup of the first data set is first performed followed by the backup of the second data set (using either the same stream or different streams).

It may be appreciated that the backup window may be determined by the specific order of the data sets, with one order resulting in a larger backup window, and another order resulting in a smaller backup window. The user/administrator typically determines the correct order (which reduces the backup window) by trial and error.

The techniques described herein reduce the backup window by performing the backups of the data sets according to their sizes. For the above example, the backup of the second data set is performed before the backup of the first data set if the second data set is bigger (in size) than the first data set, though contrary to the order indicated by the user/administrator. It is generally observed that the performance of the backups of the bigger data sets before the backups of the smaller data sets results in reducing the backup window.

In one embodiment, on receiving the collection of data sets to be sorted in a specific order, the corresponding sizes of the data sets are first determined. The collection of data sets is then sorted according to the descending order of their sizes to form a sorted order. The backups are then performed in the sorted order, though contrary to the specific order.

Several techniques of the present invention may be used for performing the backup of data sets from one or more source systems to one or more target systems. In such an environment, the backups are performed by agents executing in the source systems, with each agent designed to copy the data from the source system to a target system using an available stream. Accordingly, the backups of a collection of data sets are performed by starting the copying of the data from a source system to a target system (by interfacing with the appropriate agent) in the descending order of the sizes of the data sets. The backup window for the collection of data sets is accordingly reduced.

The techniques of the present invention may be particularly suitable when the data sets sought to be backed up are of different sizes, in particular, when there is large difference between the sizes of the bigger data sets and the smaller data sets. For example, data sets that correspond to a set of files/directories contained in a file system hosted on the server or a set of data contained in a database hosted on the server typically have different sizes. For such different sized data sets, the backup window may be considerably reduced by performing the backups of the bigger data sets before the backups of the smaller data sets.

Reference is now made in detail to exemplary embodiments of the invention, examples of which are illustrated in the accompanying Figures.

FIG. 1 shows an example environment in which several aspects of the present invention are implemented in one embodiment. The example environment is shown containing servers 140A-140C, storages 170A-170B, and backup tool 150 connected by network 120. However, the example environment may contain more number/type of servers and storages, depending on the purpose for which the environment is designed.

Network 120 provides connectivity between the various systems of FIG. 1 and may be implemented using protocols such as Transmission Control Protocol (TCP) and/or Internet Protocol (IP), well known in the relevant arts.

Each of servers 140A-140C represents a system such as a server system, a personal computer, workstation, mobile station, etc. or any other system/device storing data sets that are sought to be backed up. The data sets may correspond to a set of files/directories contained in a file system hosted on the server or a set of data contained in a database hosted on the server. In one embodiment, each server maintains configuration information specifying the corresponding collection of data sets to be backed up, as well as the specific order in which the backup is to be performed.

Each of storages 170A-170B represents an external non-volatile storage system facilitating storage and retrieval of a collection of data by other systems connected to network 120. Each storage may be implemented as a relational database system and therefore provide storage and retrieval of data using structured queries such as SQL (Structured Query Language). Alternatively, storage may be implemented as a file system providing storage and retrieval of data in the form of one or more files organized as one or more directories, as is well known in the relevant arts.

Backup tool 150 is designed to backup the data sets present in source systems (e.g. servers 140A-140C) to target systems (e.g. storages 170A-170B) using multiple streams. As noted above, the number of streams may be limited by the specific resources available in the source systems (servers 140A-140C), target systems (storages 170A-170B) and/or network 120. Backup tool 150 may be a NETWORKER backup tool available from EMC Corporation of Hopkinton, or other similar backup tools/systems.

Figure 2:
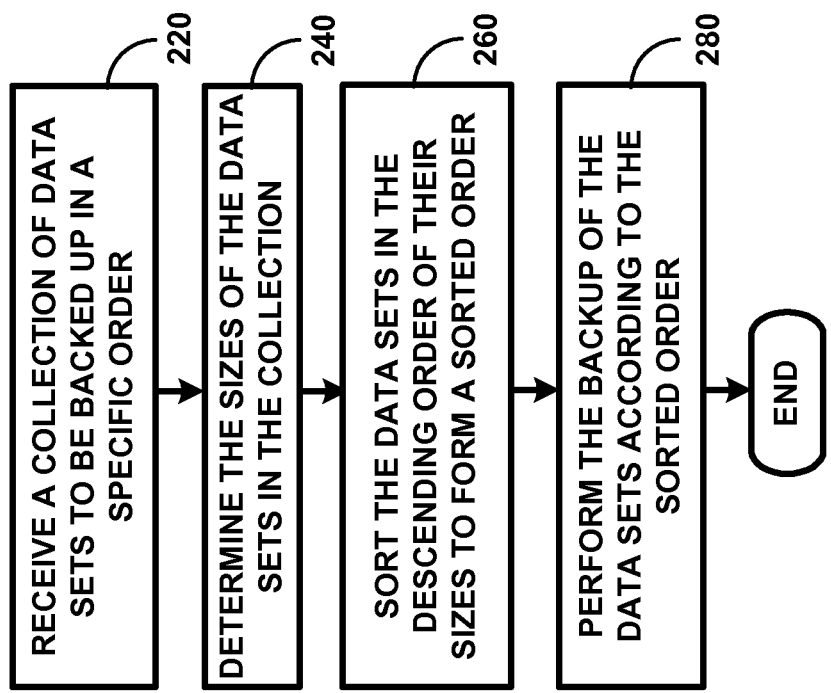
FIG. 2 shows an overview of an embodiment of performing backups using multiple streams by backup tool 150 of FIG. 1.

FIG. 2 shows an overview of an embodiment of performing backups using multiple streams by backup tool 150 of FIG. 1. However, in alternative embodiments, some of the steps may be performed in a different sequence than that depicted below, as suited to the specific environment, as will be apparent to one skilled in the relevant arts.

In step 220, backup tool 150 receives a collection of data sets to be backed up in a specific order. Backup tool 150 may receive the specific order of source systems and data sets to be included in the backup along with the corresponding target systems where the data sets are to be copied from a user/administrator (using appropriate user interfaces, not shown). In addition, the user may also specify a schedule for the backup, including a scheduled time at which the backup is to be performed. Backup tool 150 may be designed to perform the backup only at the scheduled time according to the schedule.

In one embodiment where each server/source system maintains configuration information specifying a corresponding collection of data sets to be backed up, backup tool 150 receives only the specific source systems to be included in the backup and in response, examines the configuration information on the specific source systems for identifying the data sets to be backed up as well as the specific order.

Furthermore, backup tool 150 may also receive an indication of whether a complete or incremental backup is sought to be performed for the collection of data sets. A complete backup indication copying all the data in each of the data sets to the target system, while an incremental backup entails copying only the data that has been modified after a previous backup to the target system.

In step 240, backup tool 150 determines the sizes of the data sets in the collection by inspecting the data sets. For example, when each data set corresponds to specific data in a database, the size of each data set may be determined as the size of the files in which the corresponding specific data is maintained by the database.

Alternatively, when each data set corresponds to a set of files contained in a file system, the size of each data set may be determined as the sum of the sizes (in bytes) of the corresponding set of files. If an incremental backup indication is received, backup tool 150 may determine the size as the sum of the sizes (in bytes) of only those files that have been modified after a previous backup.

In step 260, backup tool 150 sorts the data sets in the descending order of their sizes to form a sorted order. The sorting of the data sets may be performed using any one of the sorting techniques such as bubble sort or quick sort well known in the relevant arts.

In step 280, backup tool 150 performs the backup of the data sets according to the sorted order, though contrary to the order received in step 220. In other words, even though a first and second data sets contained in the collection of data sets are indicated to be performed in the named order (first followed by the second), backup tool 150 performs first the backup of the second data set (followed by the backup of the first data set) if the size of the second data set is determined to be bigger than the size of the first data set.

Thus, backup tool 150 performs the backup of the bigger (in size) data sets before the backup of the smaller data sets, thereby reducing the backup window.

Figure 3:
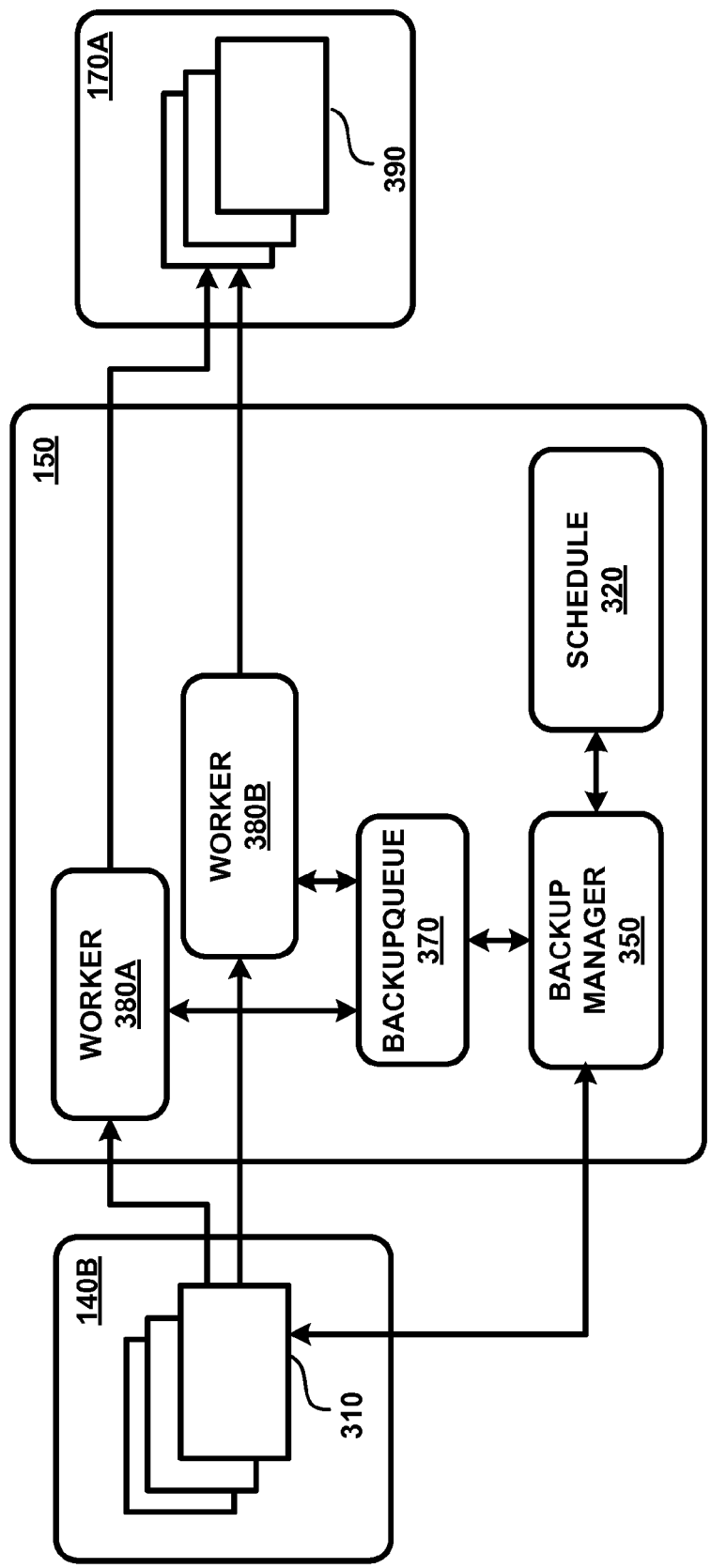
FIG. 3 shows components of an example implementation for performing backups using multiple streams, such as backup tool 150 of FIG. 1.

FIG. 3 shows components of an example implementation for performing backups using multiple streams, such as backup tool 150 of FIG. 1. Though only the backup of data from a single source system (server 140B) to a single target system (storage 170A) is shown, the data from other source systems (such as servers 140A and 140C) to different target systems (such as storage 170B) may be similarly performed by backup tool 150.

Server 140B is shown storing data sets 310 that are sought to be backed up to storage 170A (as corresponding ones of data sets 390). Each of data sets 310 may correspond to a set of files/directories present in the file system hosted on server 140B or may correspond to a file containing specific (portions of) data of a database hosted on server 140B.

Backup tool 150 is implemented to perform backups of the data sets 310 using multiple streams according to several aspects of the present invention. Backup tool 150 is shown containing schedule 320, backup manager 350, backup queue 370 and workers 380A-380B.

Schedule 320 specifies the details of the backups to be performed by backup tool 150, such as the schedule and time at which backups are to be performed, the details of the source systems and data sets to be backed up and the target systems to which the data sets are to be copied.

Figure 4:
FIG. 4 shows an example schedule according to which backups are performed by backup tool 150 of FIG. 1.

FIG. 4 shows an example schedule (320) according to which backups are performed by backup tool 150 of FIG. 1. The backup schedules are typically specified by a user/administrator using appropriate interfaces. The backup schedule is shown as being maintained in a tabular format merely for convenience. However, in alternative embodiments, the schedule may be maintained using any convenient data format such as extensible markup language (XML).

Columns "Backup Name", "Schedule" and "Start Time" respectively specify the name, the schedule (such as every day, every Monday, every month, etc.) and the start time of performing the backup. Column "Source" specifies the data sets (and the source system) to be backed up, while column "Target" specifies the target location (and the target system) to which the data sets are to be copied.

The description is continued assuming that the texts "192.168.1.141" and "192.168.1.170" respectively represent the IP addresses of server 140B and storage 170A. Furthermore, it is assumed that each data set is specified as a corresponding directory in a file system (e.g. "\EDrive", "\Personal\Docs") or as a file name (e.g. "main.dbs", "index.dbs") containing the specific data of a database sought to be backed up. In the scenario that a directory is specified, backup tool 150 is required to backup the contents of the directory as well as all the files/sub-directories present below it in the hierarchy of the file system.

Thus, schedule 320 of FIG. 4 specifies two backups "Bck100" and "Bck200" that are to be performed at 12.00 AM and 12.30 AM respectively for backing up data sets (as specified in the "Source" column) from the source system server 140B to the target system storage 170B (in particular to the target location specified in the "Target" column).

Referring again to FIG. 3, backup manager 350 continually monitors the backup schedule for identifying the backups to be performed. Accordingly, at 12.00 AM and 12.30 AM on each day, backup manager 350 identifies that the respective backups named "Bck100" and "Bck200" are to be performed.

On identifying that a backup is to be performed, backup manager 350 inspects the data sets sought to be backed up (in one embodiment, by communicating with a backup agent installed in the source systems) to determine the specific data to be copied. For example, for the backup "Bck100", backup manger 350 may inspect data sets 310 to determine the specific data to be copied to the target location.

For example, when a directory is specified as a data set, backup manager 350 may recursively traverse the file system hierarchy below the directory to determine the complete list of files/subdirectories to be copied to the target system. In a scenario an incremental backup is indicated, backup manager 350 may determine the specific files that have been modified after the previous backup based on the create/modified dates or archive bit associated with each file, as is well known in the relevant arts.

Backup manager 350 may also generate metadata corresponding to the data sets, such as the size (in bytes) of each data set, the number of files/directories to be copied in each data set, the attributes that are associated with the file, etc.

Figure 5:
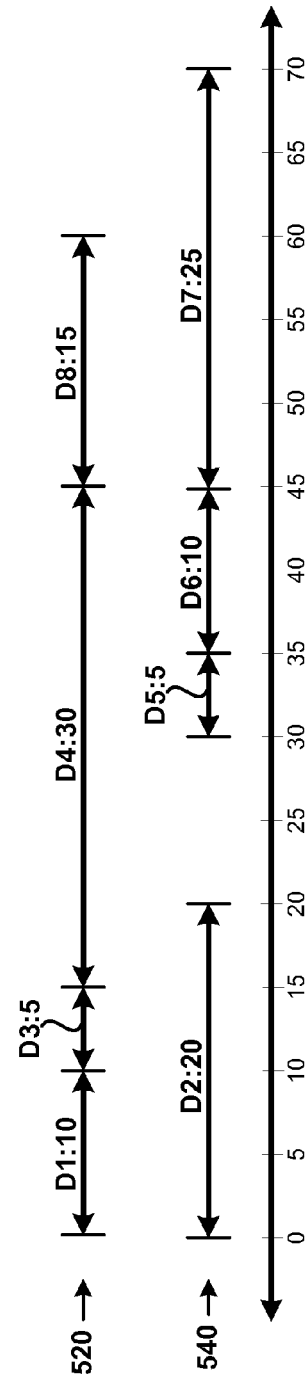
FIGS. 5A and 5B respectively shows metadata corresponding to two different backups generated by backup tool 150 of FIG. 1.
FIG. 5C shows the manner in which backup tool 150 of FIG. 1 performs backups using multiple streams in a prior approach.

FIGS. 5A and 5B respectively shows metadata corresponding to two different backups generated by backup tool 150 of FIG. 1. In particular, FIG. 5A shows the metadata generated (by backup manager 350) for the backup named "Bck100", while FIG. 5B shown the metadata generated for the backup named "Bck200". The metadata is shown in a tabular format merely for convenience.

Column "Data Set ID" specifies a unique identifier for each data set, while column "Location" specifies the source location of each data set (one of the locations in the "Source" column of schedule 320 for the corresponding backup). Column "Size" represents a metadata generated by backup manager 350 specifying the size (in terms of gigabytes or GB) of each of the data sets. It may be observed that different data sets are shown as having different sizes.

Referring again to FIG. 3, after successful determination of the data sets (and the corresponding metadata), backup manager 350 adds the data sets as corresponding tasks to backup queue 370 according to the order in which the backups are required to be performed.

Backup queue 370 maintains a queue of (pending) tasks that are to be performed by workers 380A-380B. Each of the tasks corresponds to the backup of one data set (for example, one of data sets 310) from a source system (such as server 140B) to a target system (such as storage 170A). In one approach, the size of backup queue 370 is fixed, and the tasks for each of the data sets are added as and when tasks are removed from queue. Alternatively, tasks for each of the data sets may be added to backup queue 370 initially before performance of any of the tasks.

Each of workers 380A-380B represents a stream of execution (implemented either as independent threads or processes) designed to check for a pending task in backup queue 370, remove the task from backup queue 370 (if present) and to perform the task.

In one embodiment, each worker is associated with a single stream between the source system and the target system. Accordingly, each worker checks for a pending task in backup queue 370 only when the associated stream is free (i.e., can be used for backup), removes a pending task (if present), and then copies the data set (specified in the task) from the source system to the target system using the associated stream. The copying of the data set may entail reading the data set from the source system (such as one of data sets 310 in server 140B) and then writing the data set to the specific target location in the target system (such as data sets 390 in storage 170B).

In an alternative embodiment, each worker is designed to interface with a backup agent present in the source systems to perform the task of copying the data set from the source system to the target system. Accordingly, each worker monitors the status of a corresponding stream, and removes a pending task from backup queue 370 only when the status of the corresponding stream is free. The worker then interfaces with the backup agent in the appropriate source system (as indicated by the task) to cause the backup of the data sets specified in the task to be performed. The backup agent notifies the worker on a successful completion of the backup.

As each worker is closely associated with a corresponding stream, the presence of workers 380A-380B in backup tool 150 may indicate that the backups of the data sets are being performed using only two streams. Accordingly, the description is continued assuming that backup tool 150 uses only two streams for performing backups. However, various aspects of the present invention may be implemented in other environments having more number of streams/workers and/or with multiple streams associated to/monitored by a single worker, as will be apparent to one skilled in the relevant arts by reading the disclosure herein.

It may be further appreciated that by using a backup queue, the tasks (backups of data sets) are performed according to a strict order (referred to as First In First Out or FIFO), as is well known in the relevant arts. Accordingly, backup manager 350 is required to add the tasks to backup queue 370 in the desired order of performance of the backups to cause the starting of the copying of the data sets in the desired order.

FIG. 5C shows the manner in which backup tool 150 of FIG. 1 performs backups using multiple streams in a prior approach. In the prior approach, backup manager 350 adds the data sets (as corresponding tasks) in the order specified in schedule 320. Thus, at 12.00 AM, based on the metadata shown in FIG. 5A, backup manager 350 adds the data sets D1, D2, D3 and D4 in that order to backup queue 370, while at 12.30 AM, based on the metadata shown in FIG. 5B, backup manager 350 adds the data sets D5, D6, D7 and D8 in that order to backup queue 370.

The description is continued assuming that backup tool 150 uses two streams (520 and 540) and that the data is copied at a steady rate of 1 GB per minutes. Merely for convenience, it is assumed that when both streams 520 and 540 are free (can be used for performing backups), stream 520 is chosen over stream 540.

Accordingly, FIG. 5C shows a time line marked at intervals of 5 minutes from minute 0 (corresponding to 12.00 AM) to minute 70. The performance of the backups of each of the data sets is shown as a corresponding left right arrow marked with the identifier of the data set and the time taken to perform the backup (separated by a ":"). Thus, "D1:10" indicates that the backup of the data set D1 is performed and that it took 10 minutes, and accordingly the corresponding left right arrow is shown from 0 to 10 in the timeline.

It may be observed that the backups of the data sets D1 and D2 are first performed followed by the performance of the data sets D3 and D4 according to the order in which backup manager 350 added the data sets to backup queue 370. Furthermore, the start of copying the data sets is also according to the order D1, D2, D3, D4 added to backup queue 370. However, it may be noted that the backups of data sets D1, D3 and D4 are preformed using stream 520, while only the backup of data set D2 is performed using stream 540.

Accordingly, stream 540 remains free (as indicated by the gap between D2 and D5) until the next set of tasks corresponding to "Bck200" are added by backup manager 350 at 12.30 AM. The backups of the next collection of data sets containing D5, D6, D7 and D8 are then performed. It may be again noted that stream 540 is used for backup of data sets D5, D6 and D7, while stream 520 is used only for the backup of data set D8.

Such non-uniform usage of streams may result in a larger backup window. As noted above, the backup window is defined as the time taken to perform the backups of a sequence of data sets. Accordingly, the backup window for the backup "Bck100" is 45 minutes (from the starting of the backup of data set D1 to the ending of the backup of the data set D4), while the backup window for the backup "Bck200" is 40 minutes (from the starting of D5 to the ending of D7). The backup window for both the backups is 70 minutes (from the starting of D1 to the ending of D7).

Referring again to FIG. 3, backup manager 350, provided according to several aspects of the present invention, performs the backups of the data sets according to their sizes. In other words, backup manager 350 ensures that backups of the bigger data sets are performed before the backups of the smaller data sets.

Figure 6:
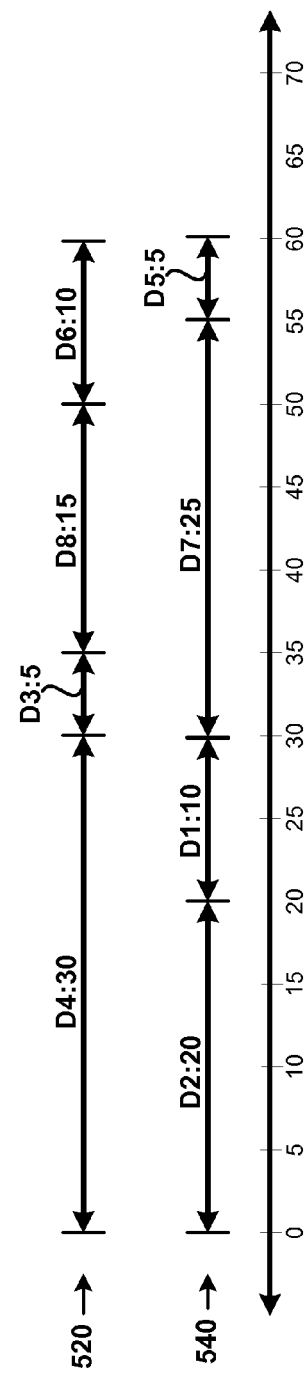
FIGS. 6A and 6B respectively shows data sets corresponding to two different backups sorted by backup tool 150 of FIG. 1 in the descending order of their sizes.
FIG. 6C shows the manner in which backup tool 150 of FIG. 1 performs backups using multiple streams according to an embodiment of the present invention.

In one embodiment, backup manager 350 first sorts the data sets based on their sizes after generation of the metadata. FIGS. 6A and 6B respectively shows data sets corresponding to two different backups sorted by backup tool 150 of FIG. 1 in the descending order of their sizes. In particular, FIG. 6A shows the metadata of FIG. 5A generated for the backup "Bck100" sorted by the size, while FIG. 6B shows the metadata of FIG. 5B generated for the backup "Bck200" sorted by the size.

Backup manager 350 then adds the data sets (as corresponding tasks) in the sorted order. Thus, at 12.00 AM, based on the sorted metadata shown in FIG. 6A, backup manager 350 adds the data sets D4, D2, D1 and D3 in that order, while at 12.30 AM, based on the sorted metadata shown in FIG. 6B, backup manager 350 adds the data sets D7, D8, D6 and D5 in that order.

FIG. 6C shows the manner in which backup tool 150 of FIG. 1 performs backups using multiple streams according to an embodiment of the present invention. Similar number are used to refer to similar portions of FIG. 6C and FIG. 5C and accordingly their description is not included here for conciseness.

It may be observed that the backups of the bigger data sets D4 and D2 are performed before the backups of the smaller data sets D1 and D3. The start of copying the data set is also according to the order D4, D2, D1, D3 added to backup queue 370. Furthermore, it may be noted that each of streams 520 and 540 is used for performing the backups of two data sets. Similarly, for the backup "Bck200", the backups of the bigger data sets D8 and D7 are first performed before the backups of the smaller data sets D6 and D5 (again using the streams 520 and 540 uniformly), with the start of copying the data sets following the sorted order.

Accordingly, the backup window for the backup "Bck100" is reduced from 45 minutes (in the prior approach) to 35 minutes (from the starting of D4 to the ending of D3), while the backup window for the backup "Bck200" is reduced from 40 minutes to 30 minutes (from the starting of D7 to the ending of D5). The backup window for both the backups is also reduced from 70 minutes to 60 minutes (from the starting of D4 to the ending of D5).

Thus, the backup window for performing backups using multiple streams is reduced by performing the backups of the bigger data sets before the backups of the smaller data sets.

Figure 7:
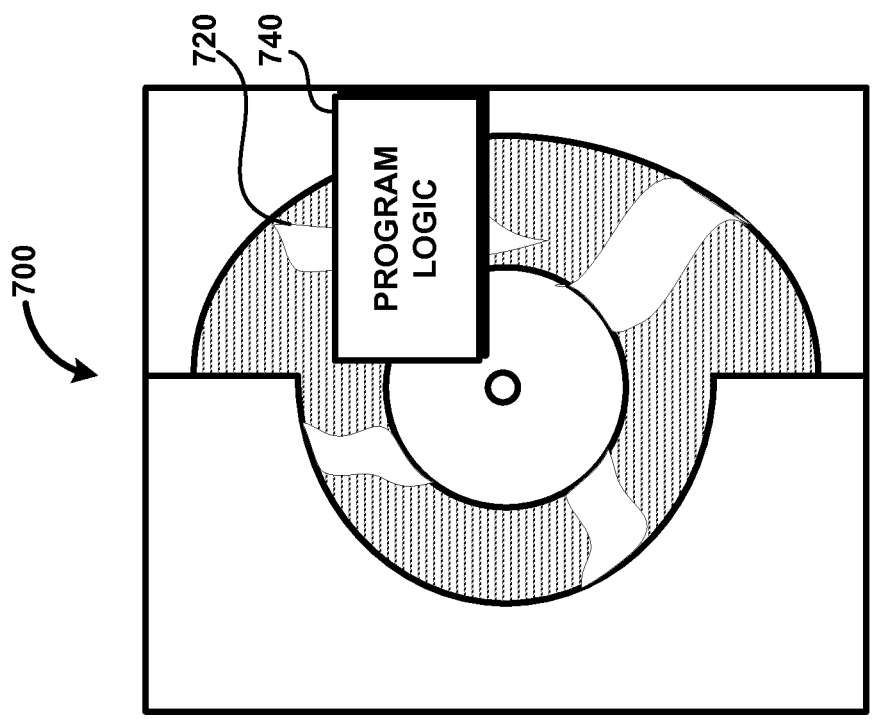
FIG. 7 shows a computer-readable medium encoded for computer-execution of graceful stopping of a multi-threaded application embodiment of FIG. 2.

FIG. 7 shows a computer-readable medium encoded for computer-execution of graceful stopping of a multi-threaded application embodiment of FIG. 2. Program logic 740 embodied on computer-readable medium 720 is encoded in computer-executable code configured for carrying out the prediction of the policies and other aspects of the present invention described herein and thereby forms a computer program product 700.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of a program code, which when received and loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method of performing backups using multiple streams, the method comprising:
   receiving a first collection of data sets and a second collection of data sets, wherein the first collection of data sets are scheduled for being backed up after a first time point and the second collection of data sets are scheduled for being backed up after a second time point,
wherein the second time point follows the first time point, the first collection of data sets being specified in a specific order when received, the first collection of data sets including a first data set and a second data set, wherein the second data set follows the first data set according to the specific order;
sorting the first collection of data sets according to the respective sizes of the data sets to form the first collection of data sets in a sorted order, wherein a data set having a bigger size is placed ahead of data set with a smaller size, wherein the second data set is bigger than the first data set such that the second data set is earlier in the sorted order compared to the first data set; and
scheduling for the backup of the first collection of data sets and the second collection of data sets using a plurality of streams,
wherein each of the first collection of data sets is scheduled for starting of backup before starting of any of the second collection of data sets in view of the second time point following the first time point,
wherein some of the first collection of data sets are backed up using a first stream of the plurality of streams and some others of the first collection of data sets are backed up using a second stream of the plurality of streams,
wherein each of the first collection of data sets is scheduled for backup on one of the plurality of data streams in the sorted order such that the backup of the second data set starts before the backup of the first data set.

2. The method of claim 1, wherein the sorting also sorts the second collection of data sets according to the respective sizes of the data sets to form the second collection of data sets according to the sorted order, wherein a data set having a bigger size is again placed ahead of a data set with a smaller size in the sorted order,
wherein some of the second collection of data sets are also backed up using the first stream and some others of the second collection of data sets are also backed up using the second stream,
wherein each of the second collection of data sets is scheduled for backup on one of the plurality of data streams according to the sorted sequence such that the backup of earlier ones in the sorted sequence starts ahead of the later ones in the sorted sequence,
wherein the sorting of the first collection of data sets and the second collection of data sets results in reducing the duration of a backup window for performing backups of the first collection of data sets and the second collection of data sets together.

3. The method of claim 2, wherein the performing performs the backup of the second data set using the first stream and the backup of the first data set using the second stream.

4. A non-transitory machine readable storage medium storing one or more sequences of instructions for causing a system to perform backups using multiple streams, wherein execution of the one or more sequences of instructions by one or more processors contained in the system causes the system to perform the actions of:
receiving a first collection of data sets and a second collection of data sets, wherein the first collection of data sets are scheduled for being backed up after a first time point and the second collection of data sets are scheduled for being backed up after a second time point,
wherein the second time point follows the first time point, the first collection of data sets being specified in a specific order when received, the first collection of data sets including a first data set and a second data set, wherein the second data set follows the first data set according to the specific order;
sorting the first collection of data sets according to the respective sizes of the data sets to form the first collection of data sets in a sorted order, wherein a data set having a bigger size is placed ahead of data set with a smaller size, wherein the second data set is bigger than the first data set such that the second data set is earlier in the sorted order compared to the first data set; and
scheduling for the backup of the first collection of data sets and the second collection of data sets using a plurality of streams,
wherein each of the first collection of data sets is scheduled for starting of backup before starting of any of the second collection of data sets in view of the second time point following the first time point,
wherein some of the first collection of data sets are backed up using a first stream of the plurality of streams and some others of the first collection of data sets are backed up using a second stream of the plurality of streams,
wherein each of the first collection of data sets is scheduled for backup on one of the plurality of data streams in the sorted order such that the backup of the second data set starts before the backup of the first data set.

5. The non-transitory machine readable storage medium of claim 4, wherein the sorting also sorts the second collection of data sets according to the respective sizes of the data sets to form the second collection of data sets according to the sorted order, wherein a data set having a bigger size is again placed ahead of a data set with a smaller size in the sorted order,
wherein some of the second collection of data sets are also backed up using the first stream and some others of the second collection of data sets are also backed up using the second stream,
wherein each of the second collection of data sets is scheduled for backup on one of the plurality of data streams according to the sorted sequence such that the backup of earlier ones in the sorted sequence starts ahead of the later ones in the sorted sequence,
wherein the sorting of the first collection of data sets and the second collection of data sets results in reducing the duration of a backup window for performing backups of the first collection of data sets and the second collection of data sets together.

6. The non-transitory machine readable storage medium of claim 5, wherein the performing performs the backup of the second data set using the first stream and the backup of the first data set using the second stream.

7. A computing system comprising:
a source system to store a plurality of collections of data sets, wherein said plurality of collections of data sets comprises a first collection of data sets and a second collection of data sets, wherein the first collection of data sets are scheduled for being backed up after a first time point and the second collection of data sets are scheduled for being backed up after a second time point, wherein the second time point follows the first time point;
a target system to store backups of the plurality of collections of data sets; and
a backup tool operable to:
receive an indication to perform the backup of the first collection of data sets and the second collection of data sets, the first collection of data sets being specified in a specific order when received, the first collection of data sets including a first data set and a second data set, wherein the second data set follows the first data set according to the specific order;

sort the first collection of data sets according to the respective sizes of the data sets to form the first collection of data sets in a sorted order, wherein a data set having a bigger size is placed ahead of data set with a smaller size, wherein the second data set is bigger than the first data set such that the second data set is earlier in the sorted order compared to the first data set; and schedule for the backup of the first collection of data sets and the second collection of data sets using a plurality of streams, wherein each of the first collection of data sets is scheduled for starting of backup before starting of any of the second collection of data sets in view of the second time point following the first time point, wherein some of the first collection of data sets are backed up using a first stream of the plurality of streams and some others of the first collection of data sets are backed up using a second stream of the plurality of streams, wherein each of the first collection of data sets is scheduled for backup on one of the plurality of data streams in the sorted order such that the backup of the second data set starts before the backup of the first data set.

8. The computing system of claim 7, wherein the copying of the second data set using the first stream is performed by a first backup agent executing in the source system and the copying of the first data set using the second stream is performed by a second backup agent executing in the source system.

9. The computing system of claim 8, wherein the second data set is copied from the source system to the target system using the first stream and the first data set is copied from the source system to the target system using the second stream.

10. The computing system of claim 8, wherein the copying of the collection of data sets according to the sorted order results in reducing a backup window for performing backups of the first collection of data sets and the second collection of data sets together.

* * * * *